United States Patent
Kelleher et al.

(10) Patent No.: US 6,867,411 B2
(45) Date of Patent: Mar. 15, 2005

(54) OPTICALLY REBALANCED ACCELEROMETER

(75) Inventors: William P. Kelleher, Action, MA (US); Stephen P. Smith, Medford, MA (US); Richard E. Stoner, Framingham, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 125 days.

(21) Appl. No.: 10/000,584

(22) Filed: Oct. 25, 2001

(65) Prior Publication Data

US 2002/0088932 A1 Jul. 11, 2002

Related U.S. Application Data

(60) Provisional application No. 60/244,278, filed on Oct. 30, 2000.

(51) Int. Cl.$^7$ .................................... G01D 5/34
(52) U.S. Cl. ...................... 250/231.11; 250/227.11; 73/514.19
(58) Field of Search .............. 250/231.1, 231.11, 250/231.12, 221; 73/1.37, 1.38, 1.41, 1.39, 382 R, 514.01, 514.17, 514.19, 514.26, 514.2–514.24; 356/248, 250–254; 280/734, 735

(56) References Cited

U.S. PATENT DOCUMENTS

| | | | |
|---|---|---|---|
| 3,731,542 A | | 5/1973 | Forsberg |
| 3,808,550 A | * | 4/1974 | Ashkin ........................ 372/97 |
| 3,858,451 A | * | 1/1975 | Stiles ....................... 73/514.18 |
| 4,092,535 A | * | 5/1978 | Ashkin et al. ............... 250/251 |
| 4,368,981 A | * | 1/1983 | Ozeki ......................... 356/477 |
| 4,792,931 A | | 12/1988 | Nishida et al. |
| 4,819,486 A | * | 4/1989 | Kunkel et al. ............. 73/382 R |
| 4,846,545 A | * | 7/1989 | Estabrook et al. ............ 385/99 |
| 5,050,435 A | * | 9/1991 | Pinson ..................... 73/514.18 |
| 5,627,644 A | * | 5/1997 | Sanders ...................... 356/464 |

OTHER PUBLICATIONS

Ashkin, A., "Forces of a single–beam gradient laser trap on a dielectric sphere in the ray optics region," Biophys. J. 61, 569–582 (1992).

Svoboda, K. and Steven M. Block, "Biological Applications of Optical Forces," Ann. Rev. Biophys. Biomol. Struc. 23, 247–285 (1994).

Smith, S. P. et al., "Inexpensive optical tweezers for undergraduate laboratories," Am. J. Phys. 67, 26–35 (1999).

Constable, A. et al., "Demonstration of a fiber–optical light–force trap," Optics Letters 18, 1867–1870 (1993).

Ashkin, A. and J. M. Dziedzic, "Feedback stabilization of optically levitated particles," Applied Physics Letters, 30, 202–204 (1977).

(List continued on next page.)

Primary Examiner—Thanh X. Luu
Assistant Examiner—Stephen Yam
(74) Attorney, Agent, or Firm—McDermott Will & Emery LLP

(57) ABSTRACT

An optical accelerometer for detecting an acceleration of a proof mass includes a source of optical radiation for generating a pair of beams of output radiation. The pair of beams of optical radiation exerts radiation pressure on the proof mass, so as to maintain the proof mass in an equilibrium position along a sensing axis. A position detecting system detects a displacement from the equilibrium position of the proof mass along the sensing axis in response to an inertial force acting on the proof mass. A modulator adjusts the intensity of each one of the pair of beams, so as to restore the proof mass to the equilibrium position along the sensing axis. The difference in the adjusted intensities of each one of the pair of beams is representative of the acceleration, resulting from the inertial force, of the proof mass along the sensing axis.

15 Claims, 7 Drawing Sheets

OTHER PUBLICATIONS

Ashkin, A., "Acceleration and Trapping of Particles by Radiation Pressure," Physical Review Letters, 24, 156–159 (1970).

Ashkin, A. and J. M. Dziedzic, "Optical Levitation by Radiation Pressure," Applied Physics Letters, 19, 283–285 (1971).

Roosen, G. and C. Imbert, The TEM*01 Mode Laser Beam–A Powerful Tool for Optical Levitation of Various Types of Spheres, Optics Communication, 26, 432–436 (1978).

* cited by examiner

| TIORA Accelerometer Properties ||
|---|---|
| Maximum Acceleration (Operating) | 100 g |
| Minimum Acceleration | 1 μg (1 sec average) |
| Mass | 100 grams |
| Volume | 30 cm^3 |
| Power Consumption | 4W |
| Radiation hardenable | Yes (Analog Electronics, Digital Electronics, Lasers, Precision Current Source) |
| Closed Loop | Yes |
| Voltage Supplies | 5, +/- 12 V |
| Scale Factor Drift | < 1 ppm |
| Scale Factor Nonlinearity | < 1 ppm |
| Uncalibrated Scale Factor | +/- 2% |
| Bias Stability | < 1 μg |
| Uncompensated Bias | < 1 mg |
| Cross Axis Sensitivity (uncalibrated, unservoed, 100Hz) | < 1 ppm |
| Residual Cross Axis Sensitivity | < 0.01 ppm |
| Magnetic shielding | minimal |
| Electrical shielding | standard (electronics) |
| Fluids | None |
| Materials | Stainless Steel, Fused silica |

FIG. 7

OPTICALLY REBALANCED ACCELEROMETER

CROSS-REFERENCE TO RELATED APPLICATIONS

This application claims right of priority based on U.S. Provisional Application Ser. No. 60/244,278, filed on Oct. 30, 2000.

STATEMENT REGARDING FEDERALLY SPONSORED RESEARCH

Not Applicable

REFERENCE TO MICROFICHE APPENDIX

Not Applicable

FIELD OF THE INVENTION

The present invention relates generally to accelerometers, and more particularly to optically rebalanced accelerometers.

BACKGROUND OF THE INVENTION

Instruments which can sense departures of their own reference frame from an inertial reference frame are of practical and commercial use in many areas, for example inertial navigation and guidance. Such departures include accelerations, by way of example. Acceleration is commonly sensed by measuring either the displacement of a proof mass in response to an inertial force, or the restoring force necessary to restore the displacement of a proof mass.

Accelerometers that use electromechanical components are known in the art. In particular, multi-axis sensors are useful for inertial sensing of motion in three dimensions. In the past, such sensors have been constructed from relatively large and expensive electromagnetic components. More recently, MEMS (microelectro-mechanical systems) sensors have been fabricated from silicon wafers, using semiconductor processing techniques such as photolithography. One advantage of microfabricated sensors is the possibility of large scale production and ensuing lower costs. Another advantage is the small size and weight of the accelerometer.

The manufacturing base for electromechanical instruments is, however, saturated and on the decline. In contrast, there is a growing manufacturing base, as well as a growing body of skilled workers, in the rapidly expanding fiberoptic communications industry. Because of the large and growing infrastructure built by the fiberoptic telecommunications industry, an inertial sensor that uses only electrooptical components, and that therefore shares many subsystems and components with the fiberoptics industry, can be built economically.

An all-optical accelerometer is not only a totally innovative concept, but also very desirable, because such an accelerometer would provide many advantages over prior art electromechanical inertial sensors. For example, unlike electromechanical accelerometers, an all-optical accelerometer would have no moving wear surfaces. Therefore, the projected lifetime of such an instrument would be much greater than the lifetime of electromechanical accelerometers, since the lifetime of an all-optical accelerometer would be limited only by the optical source lifetime. Also, because the all-optical accelerometer has no moving wear surfaces, the accelerometer may be built as a flexure-less and very linear instrument. This eliminates the need for building flexural support structures, such as suspension assemblies, into the device. Further, unlike prior art MEMS sensors, it would be possible to recalibrate an all-optical inertial sensor during the operation of the device. Further, an all-optical inertial sensor can be built as a closed loop instrument, with a high dynamic range. Finally, using integrated optics and fiber optics components, the space and energy requirements of the accelerometer can be minimized.

It is therefore an object of this invention to provide an inertial sensor that is constructed using only electrooptical components. It is another object of this invention to provide an all-optical inertial sensor that is smaller, lighter, and has a longer lifetime alternative, as compared to conventional instruments. It is another object of this invention to provide an all-optical inertial sensor that leverages the presently growing communications and electro-optics infrastructure. It is another object of this invention to provide a MEMS inertial sensor that incorporates an entirely new force mechanism for MEMS devices.

SUMMARY OF THE INVENTION

The present invention relates to an all-optical accelerometer, which uses radiation pressure to stabilize the position of a proof mass, and which uses a rebalance mechanism to measure acceleration. In one embodiment, an optical accelerometer constructed in accordance with the present invention includes a proof mass positioned along a sensing axis, and a source of optical radiation. The source of optical radiation may be a laser source. A pair of beams of output radiation from the source is adapted to exert radiation pressure on the proof mass, so as to maintain the proof mass in an equilibrium position along the sensing axis. A position detecting system senses a displacement of the proof mass from the equilibrium position, in response to an inertial force acting on the proof mass. One or more modulators, or other means for adjusting light intensity, adjusts the intensity of each beam in the pair of beams, so as to restore the proof mass to the equilibrium position. A difference in the adjusted intensities of each beam in the pair of beams is representative of the acceleration of the proof mass along the sensing axis, in response to the inertial force.

In one embodiment, the optical accelerometer may include a light-directing mechanism for directing the pair of beams in opposite directions along the sensing axis, so that each beam impinges upon opposite sides of the proof mass. The light-directing mechanism may include one or more optical fibers.

In one embodiment, the optical accelerometer may include a coupling mechanism for coupling each beam in the first pair of beams to one or more optical fibers. The coupling mechanism may include one or more fusion splices. In one embodiment, the optical accelerometer may further include light focusing means for aligning each beam in the pair of beams along the sensing axis. The light focusing means may include an output lens.

In one embodiment, the position detecting system may include a LED (light emitting diode) source, and a photodetector having two quadrants. Upon displacement of the proof mass away from the equilibrium position, an increase in the amount of optical radiation detected in one quadrant substantially matches a decrease in the amount of optical radiation detected in the other quadrant.

The optical accelerator of the present invention can be constructed as a three-channel, three-axis accelerator. A three-channel optical accelerometer includes a first, second and a third channels, along corresponding first, second, and third mutually orthogonal sensing axes. The optical accelerometer includes one or more sources of optical radiation that generate a first, a second, and a third pair of beams of output radiation. The first, second and third pairs of beams of radiation each exert radiation pressure on the proof mass, so as to maintain the proof mass in an equilibrium position along the corresponding first, second and third sensing axes. The combined radiation pressure from the first, second, and third pairs of beams levitates the proof mass in three-dimensional space. The three-axis accelerometer includes first, second and third position detecting systems for sensing a displacement of the proof mass from the equilibrium position along the first, second and third sensing axes, respectively, in response to an inertial force acting on the proof mass. The three-axis accelerometer includes means for adjusting the intensity of each beam in the first, second and third pairs of beams, so as to restore the proof mass to the equilibrium position along the first, second and third axes, respectively. The difference in the adjusted intensities of each beam in each pair of beams is representative of the acceleration of the proof mass along the corresponding first, second and third sensing axes.

A method for determining an acceleration includes positioning a proof mass along a sensing axis, and generating a pair of beams of optical radiation that exerts radiation pressure on the proof mass so as to maintain the proof mass in an equilibrium position along the sensing axis. The method includes detecting a displacement of a proof mass along the sensing axis in response to an inertial force, and adjusting the intensity of each beam in the pair of beams so as to restore the proof mass to the equilibrium position. The method includes measuring a difference in the adjusted intensities of each beam, so as to determine the acceleration of the proof mass in response to the accelerating force.

The optical accelerometer according to the present invention uses only electrooptical components. The optical accelerometer can therefore be built more economically, as compared to accelerometers based on electromechanical components, by taking advantage of the growing manufacturing base in the fiberoptic communication industry. Further, the projected lifetime of the optical accelerometer according to the present invention is several orders of magnitude greater than the lifetime of accelerometers based on electromechanical components, because the accelerometer has no moving wear surfaces. Finally, because integrated optics and fiberoptics is used, the optical accelerometer according to the present invention is very small, low weight, and low power.

BRIEF DESCRIPTION OF THE DRAWINGS

FIG. 7 provides a table summarizing the properties of a three axis, integrated optic, rebalance accelerometer, constructed according to the present invention.

DETAILED DESCRIPTION

The present invention relates to an all-optical, rebalanced accelerometer that uses radiation pressure to stabilize a proof mass. In overview, an optical accelerometer according to the present invention uses one or more pairs of mutually orthogonal optical beams from an optical source, in order to stabilize a proof mass, using radiation pressure from the optical beams. In response to an inertial force acting on the proof mass, the proof mass moves from its equilibrium position. The power for the optical sources is adjusted under closed-loop control, so as to restore the proof mass to its initial position. The power change required to restore the position of the proof mass to its equilibrium position is proportional to the acceleration of the proof mass.

Figure 1A:
FIG. 1(a) is a schematic diagram of the momentum transfer by an optical beam incident upon a completely absorbing surface.
Figure 1B:
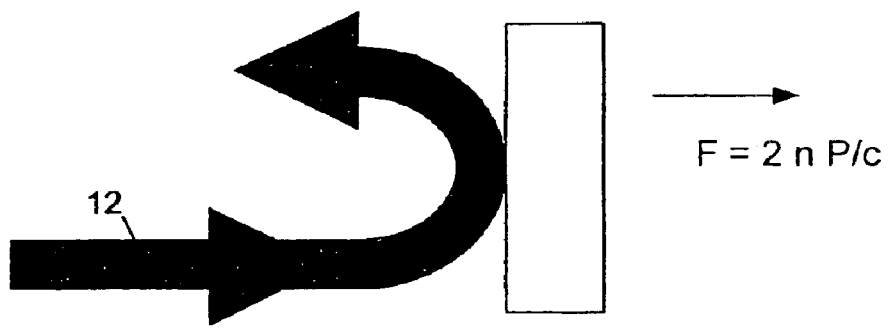
FIG. 1(b) is a schematic diagram of the momentum transfer by an optical beam incident upon a completely reflecting surface.
Figure 1C:
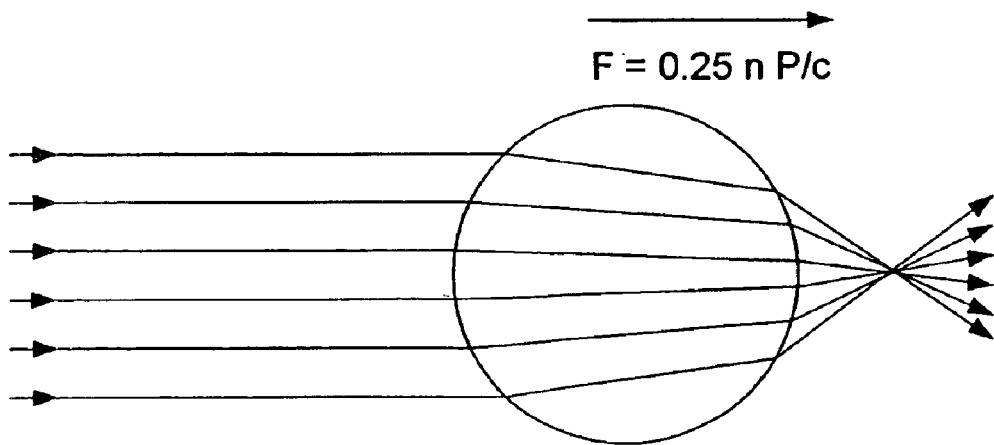
FIG. 1(c) is a schematic diagram of the momentum transfer by an optical beam which has an intensity P and which is incident upon a dielectric sphere with an index of refraction higher than the surrounding medium.

FIGS. 1(a)–1(c) illustrate the physical principles behind an optical accelerometer 10, constructed according to the present invention. In the present invention, the optical accelerometer uses radiation pressure from an optical beam in order to stabilize the position of a proof mass. Since the photons in an optical beam carry momentum, when an object absorbs or redirects an optical beam, some momentum is transferred from the photons to the object. For macroscopic objects, such as a lens or a mirror, this momentum transfer is negligible. For microscopic objects, however, the momentum transfer from photons can be a very significant effect. The momentum per second carried by an optical beam with power P is given by:

$$p = nP/c = F, \tag{1}$$

where n is the index of refraction of the surrounding medium and c is the vacuum speed of light.

FIG. 1(a) is a schematic diagram of an optical beam 12 that is incident upon a completely absorbing surface. A 1 mW optical beam 12 that is completely absorbed by a particle in a vacuum exerts a force of about 3 pN. While this is a very small force, for a graphite sphere with a two micron diameter, an acceleration of the sphere of over 35 g would result from the force.

FIG. 1(b) is a schematic diagram of an optical beam 12 of intensity P incident upon a completely reflecting surface. For a perfectly reflecting surface, the force on the surface is doubled, since the light is completely reflected. Thus, $$F = 2nP/c. \tag{2}$$

The resulting acceleration is about 70 g, for a 1 mW beam incident on an aluminum sphere with a diameter of two microns.

FIG. 1(c) is a schematic diagram of an optical beam 12 with intensity P, which is incident on a dielectric sphere with an index of refraction higher than the surrounding medium. In this case, the light is neither reflected nor absorbed, but redirected. For a silica sphere with an index of refraction 1.5 surrounded by vacuum, the force is approximately:

$$F = 0.25 \, nP/c. \tag{3}$$

A 1 mW beam, incident upon a silica sphere having a 2 micron diameter and surrounded by vacuum, can impart an acceleration of over 10 g to the sphere.

Figure 2:
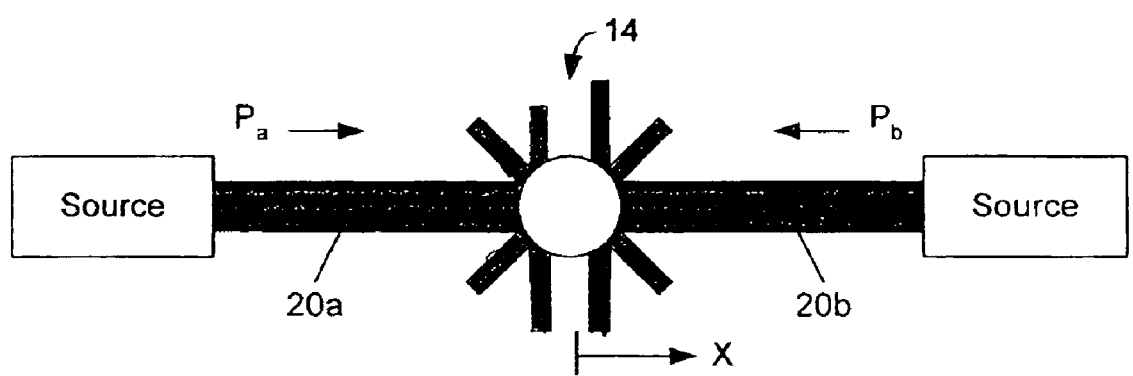
FIG. 2 is a notional diagram of a single axis, optically rebalanced accelerometer.

FIG. 2 is a notional diagram of a single axis, optically rebalanced accelerometer, constructed according to the present invention. The proof mass 14 is levitated between two opposing optical beams 20a and 20b, as shown in FIG. 2. The power of beam 20a is denoted as Pa, and the power of beam 20b is denoted as Pb. When the system is at rest, the proof mass 14 is stationary. As the system accelerates along the axis, labeled x- in the figure, a change in the position of the proof mass 14 can be detected, along a direction indicated as x- in the figure. The power Pb in the optical beam 20b is increased, in order to restore the proof mass 14 to its original position. Similarly, accelerations in the opposite (−x) direction can be balanced by adjusting the power Pa in the optical beam 20a. This force rebalance mechanism provides closed-loop control of the position of the sphere along the axis. The power change necessary to restore the proof mass to its equilibrium position can be correlated with the acceleration of the proof mass.

The power difference ΔP between the optical beams 20a and 20b (ΔP=Pa−Pb), is linearly proportional to the instantaneous acceleration. The expression for the acceleration imparted upon the proof mass 14, in response to an inertial force acting on the proof mass 14, is given by:

$$a=(\Delta P\eta)/mc, \quad (4)$$

where m is the mass of the proof mass, and η is the efficiency of the momentum extraction.

The single-axis accelerometer 10 shown in FIG. 2 only controls the position of the proof mass 14 along one axis, labeled x in the figure. No restoring force is provided for the proof mass 14 in either the y- or the z-directions. The single-axis accelerometer can easily be extended to three axes, as shown in FIG. 3.

Figure 3:
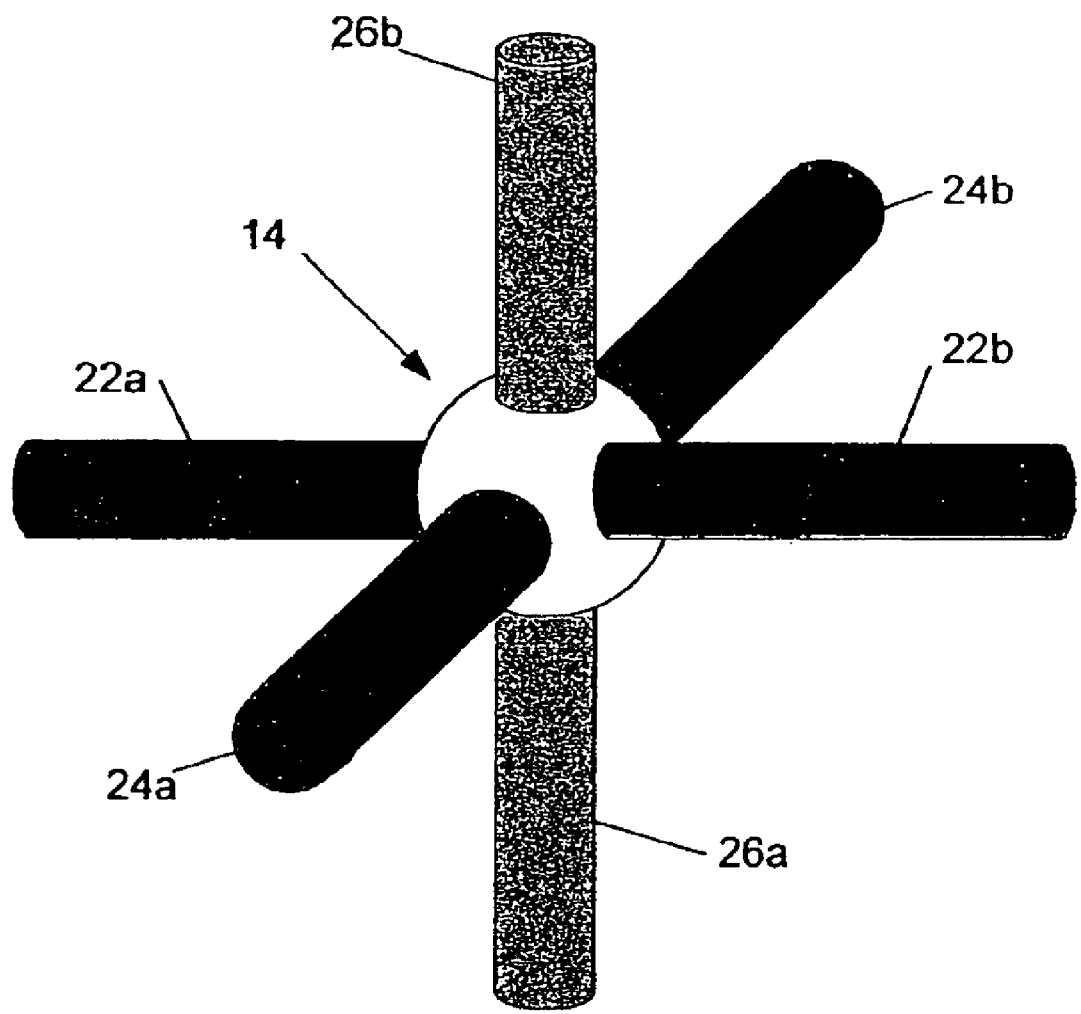
FIG. 3 is a notional diagram of one embodiment of an optical accelerometer according to the present invention, in which a pair of optical beams in the x-, y-, and z-directions stabilize a proof mass.

FIG. 3 is a notional diagram of one embodiment of an optical accelerometer according to the present invention, in which a pair of optical beams in each of the x-, y-, and z-directions stabilize a proof mass. A pair of optical beams 22a and 22b is directed along the x-axis; a pair of optical beams 24a and 24b is directed along the y-axis; and a pair of optical beams 26a and 26b is directed along the z-axis. Closed loop control of the position of the proof mass 14 is implemented on each of the three axes (x-, y-, and z-), so as to control the position of the proof mass 14, and to provide three-axis acceleration data. The optical beams are much larger than the proof mass 14, however are shown in a smaller scale in FIG. 3, for clarity. The configuration shown in FIG. 3 allows a compact, three-axis device to be built with a volume of about 30 cm3, a mass of about 100 grams, and a power consumption of about 4 Watts. In one embodiment, optical power is provided by three independent 100 mW fiber coupled lasers.

Figure 4:
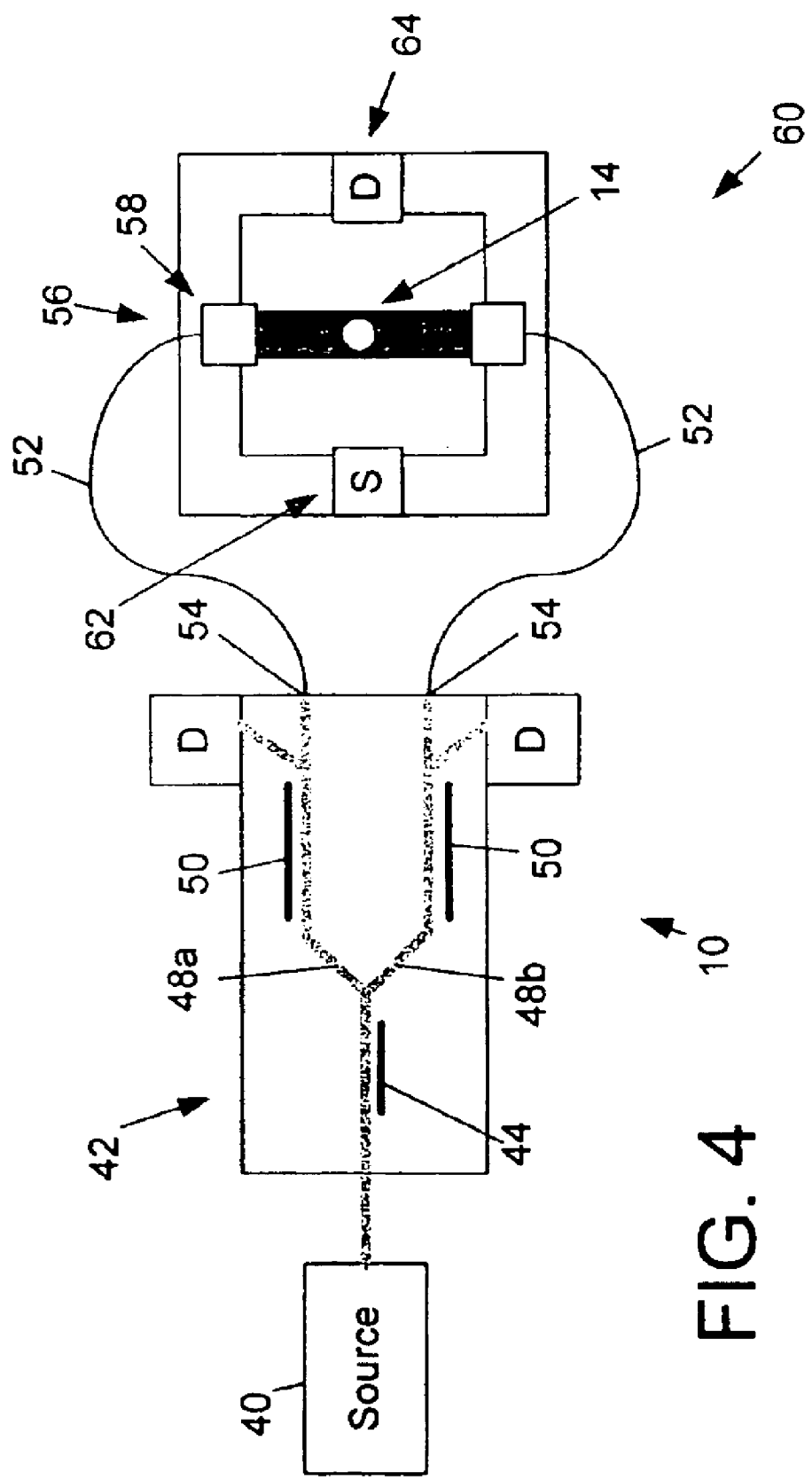
FIG. 4 is a schematic diagram of one axis of a three channel accelerometer, constructed in accordance with the present invention.

FIG. 4 is a more detailed illustration of a single axis accelerometer, constructed in accordance with the present invention. Light from an optical source 40 is coupled into an integrated optic chip 42. The optical source 40 is preferably a low coherence length laser. On the chip 42, the light passes through an intensity modulator 44. The light is then is split into a pair of equal intensity beams 48a and 48b. Each of the pair of beams are then passed through an additional intensity modulator 50. The intensity modulators 44 and 50 allow common mode and differential adjustments of beam intensities.

Each beam in the pair of beams 48a and 48b is then coupled into a light directing mechanism 52. Preferably, the light directing mechanism consists of optical fibers 52. A coupling mechanism 54 couples the beams 48a and 48b onto the optical fibers 52. In one embodiment, the coupling mechanism may be fusion splices 54. The optical fibers 52 carry the light to a light focusing means 56. The light focusing means 56 preferably includes an output lens 58. The output lens 58 is preferably mounted in a low expansion coefficient fixture, which rigidly fixes the alignment of the rebalance beams.

The optical accelerometer 10 includes a position detecting system 60 for detecting the position of the proof mass 14. In one embodiment, the position detecting system 60 includes an LED source 62 and a two-quadrant detector 64. As the proof mass 14 moves away from its equilibrium position, the amount of optical radiation increases on one quadrant, and decreases on the other quadrant. The increase in the amount of optical radiation in one quadrant substantially matches the decrease in the amount of optical radiation in the other quadrant.

The difference between the measured power of optical radiation in the two quadrants of the position detecting system 60 is a measure of the displacement of the proof mass 14. The intensities of the rebalance beams are adjusted through a servomechanism, using the measured intensity difference to stabilize the position of the proof mass 14. The difference of the intensities of the rebalance beam, as measured by the detector 64, is proportional to the applied acceleration, as given by equation (4).

Figure 5:
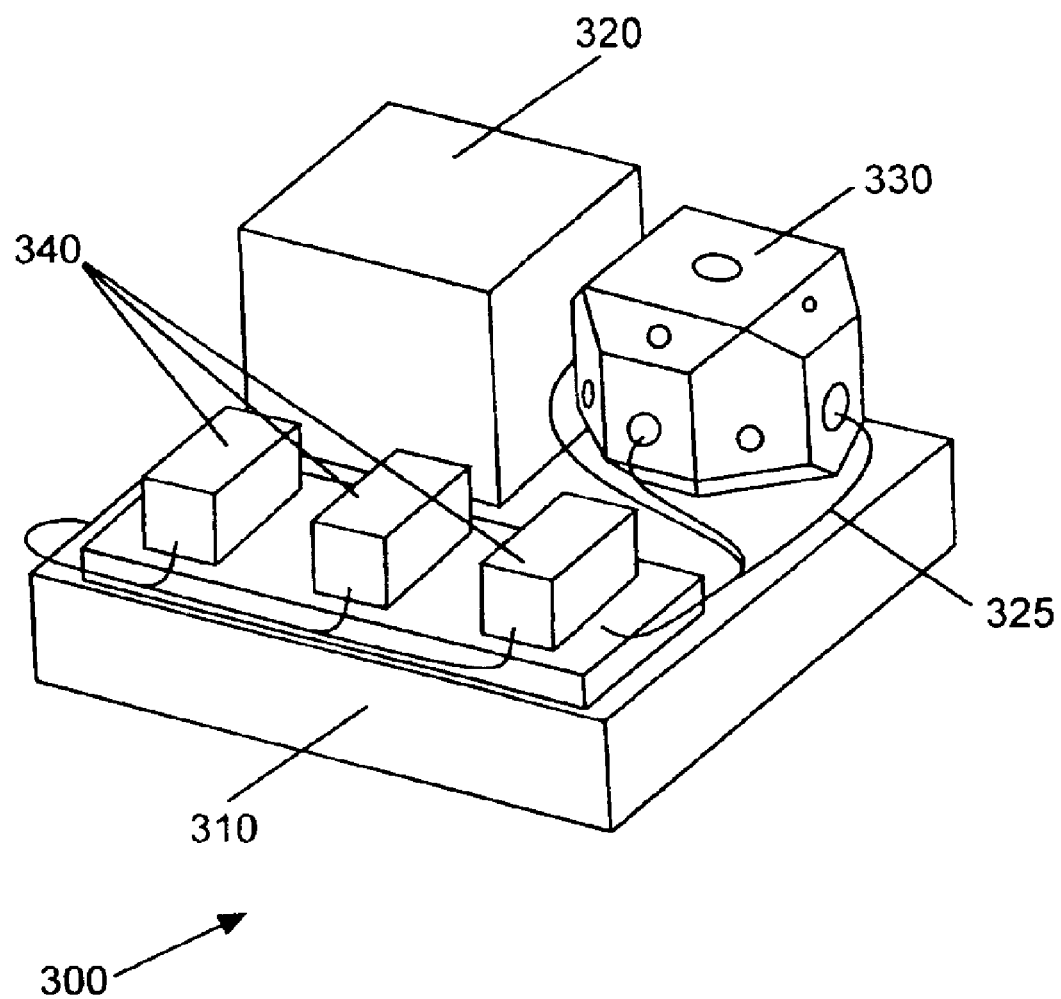
FIG. 5 provides an overall plan view of a three-dimensional, optically rebalanced accelerometer.

A complete, three-axis optical accelerometer may be constructed by assembling three of these one-axis units [[18,]] around a single proof mass 14. FIG. 5 provides an overall plan view of one embodiment of a three-dimensional, optically rebalanced accelerometer 300. As seen from the Figure, the accelerometer 300 is constructed as a single, integrated optical chip, assembled on a substrate 310. Three lasers 340 provide an optical source for three mutually orthogonal optical beams, which are directed to a sensing head 330, by means of optical fibers 325. The sensing head 330 houses a proof mass, and a position detection system for detecting the position of the proof mass. The electronics for the accelerator 300 can be assembled into a single modular unit 320. In the illustrated embodiment, the accelerometer 300 has a mass of about 400g, a size of 180 cm3, and consumes power at a rate of 4 Watt.

Figure 6:
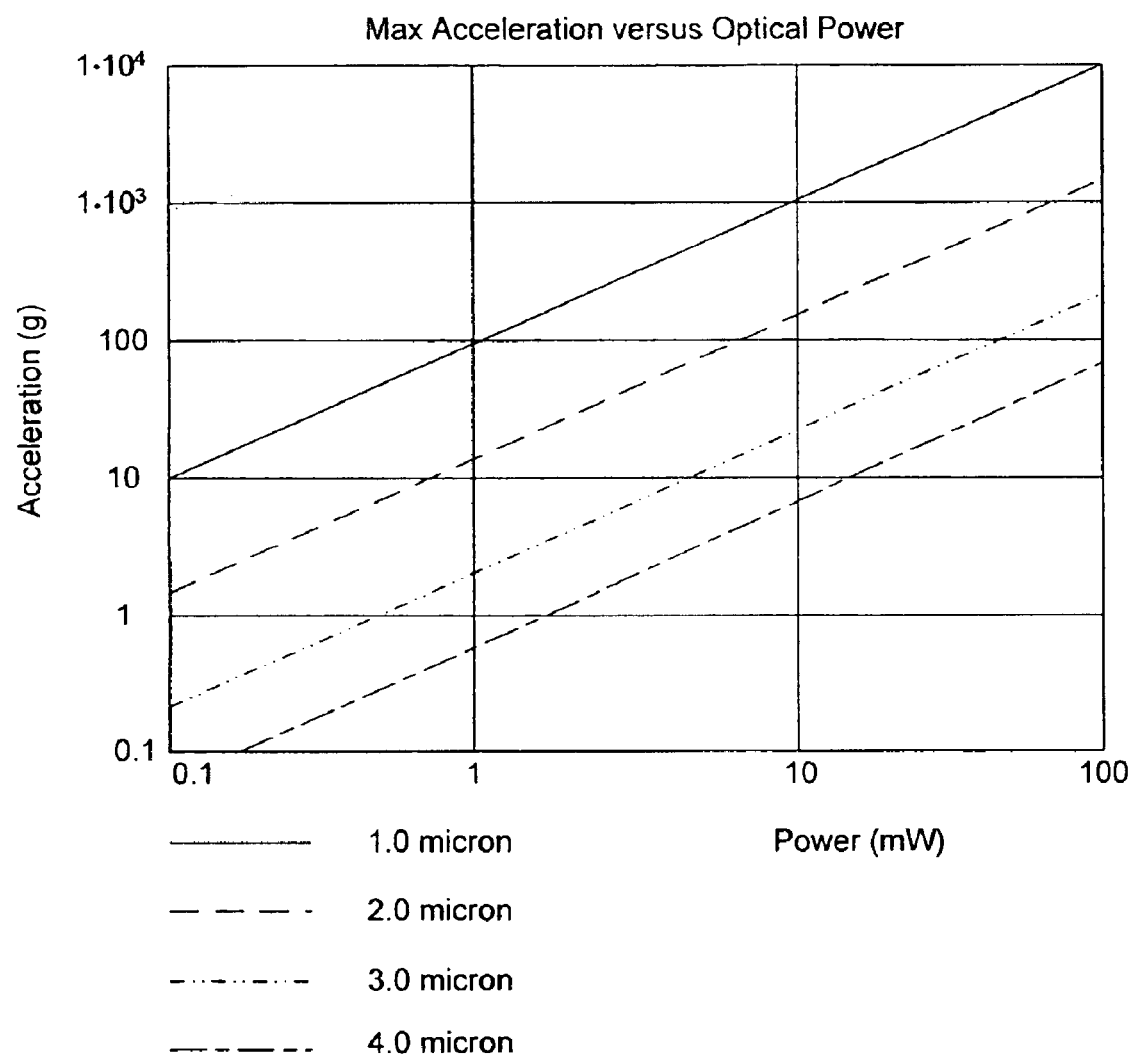
FIG. 6 shows the maximum acceleration for silica spheres in air, for a range of diameters of the spheres.

There are a number of important design considerations for the optical accelerometer 10, including: maximum survivable and measurable accelerations, thermal management of the proof mass, signal-to-noise ratio, bias stability, and scale factor stability. FIG. 6 shows the maximum acceleration for silica spheres in air, for a range of diameters of the spheres. The maximum acceleration is limited by the maximum optical rebalance force, and hence the available optical power. The maximum optical force is given by $$F=nP\eta/c, \quad (5)$$

where n is the index of refraction of the surrounding medium, P is the power, c is the vacuum speed of light, and η is a dimensionless efficiency. As seen in FIG. 6, a 2 micron sphere requires less than 10 mW of available power to balance 100 g accelerations.

Because the proof mass is optically suspended in a low pressure chamber, the ability to dissipate heat will be very limited. A metallic proof mass cannot be used, due to the relatively high metal losses (1%) at optical wavelengths. Extremely low loss dielectric, however, are readily available. For example, the glass used in optical fibers have a total loss of less than 0.1 dB/km at 1.5 microns.

Intensity noise on the force rebalance beams is expected to be the dominant source of random walk, since the proof mass will be suspended in vacuum. The intensity noise can be due to shot noise, or residual intensity noise (RIN). The magnitude of the noise is largest at maximum intensity, i.e. at maximum acceleration. For a velocity random walk of less than 1 micro-g/root Hz, and a maximum acceleration of 100 g, the RIN must be less than −80 dB, which is easily achieved in a laser source. Shot noise contributes an intensity noise of 83 dB, or a factor of 2 better than required.

There are several possible source of bias in the accelerometer, including beam misalignment and object asymmetry. Both of these biases are proportional to the incident optical power. The magnitude and direction of the bias can therefore be measured and actively corrected during normal operation by modulating the total power in the rebalance beams without changing the intensity difference. This will modulate the bias, which can then be measured and removed.

Biases due to asymmetries in the proof mass can be greatly reduced by spinning the proof mass. In addition to carrying linear momentum, light can also carry angular momentum. By adjusting the polarizations for the rebalance beams, the proof mass can be tumbled quickly enough so that any asymmetries average out to zero, over the time scales of tens of milliseconds. The need to tumble the proof mass will set a lower limit on the total power in the rebalance beams. Even with no acceleration, some power will be required to keep the proof mass spinning at an acceptable rate.

The main criterion affecting the scale factor of this accelerometer is the proportionality between the measured optical power difference and the acceleration experienced by the proof mass. There are several factors that cause this proportionality to vary, including: intensity variations across the rebalance beams, changes in proof mass index, and changes in proof mass physical size. For example, changes with temperature in the size and index of refraction of the proof mass, which is typically constructed from fused silica, could lead to scale factor changes of up to about 10 ppm/K or 100 ppm for the maximum estimated temperature excursion of 100K. These effects, however, can be measured and compensated for during operation. By modulating the intensity of each of the rebalance beams, the response of the proof mass can be directly measured. Changes in the mass of the proof mass may not be measured and corrected in this manner.

FIG. 7 provides a summary of the properties of a three axis, integrated optic, rebalance accelerometer 10, constructed according to the present invention. As seen from FIG. 7, the accelerometer 10 has a volume of 30 cm3, a mass of 100 grams, and a power consumption of 4 Watts. Also, the accelerometer has a dynamic range of 100 g, a resolution of 1 micro-g, a velocity random walk of <1 micro-g per root second (1 Hz), and can continuously recalibrate during normal operation.

The accelerometer 10 may constitute one critical component of an all-optical inertial measurement unit (AOIMU). Using only a small amount of light, as a force rebalance on a small proof mass, the present invention provides an accelerometer that is linear over a range from about 1 $\mu$g to about 100 g. The large and growing infrastructure built by the fiberoptic telecommunications industry allows such an AOIMU to be economically built, and maintained long into the future. Since the AOIMU has no moving wear surfaces, a projected lifetime of the instrument is on the order of several hundred thousand hours, limited only by the lifetime of the optical source. This will result in lower O&M costs. By using integrated optics and fiberoptics, the AOIMU will be very small, low weight, and low power.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. An optical accelerometer, comprising:
   (a) a proof mass positioned along a sensing axis;
   (b) a source of optical radiation configured to generate a pair of beams of output radiation, wherein the pair of beams of output radiation is adapted to exert radiation pressure on said proof mass so as to maintain said proof mass in an equilibrium position along the sensing axis;
   (c) a position detecting system configured to detect a displacement of said proof mass along the sensing axis from the equilibrium position in response to an acceleration force acting on said proof mass; and
   (d) an intensity adjustor configured to adjust, in response to the detected displacement, the intensity of each beam in the pair of beams so as to restore said proof mass to the equilibrium position, and to measure a difference in the adjusted intensities of each beam in the pair of beams;
   wherein the difference in the adjusted intensities of each beam is representative of the acceleration of said proof mass along the sensing axis in response to the acceleration force.

2. An optical accelerometer according to claim 1, further comprising:
   (a) a splitter for splitting the output radiation from said source into said pair of beams, each beam in said pair of beams having substantially equal intensity;
   (b) a light-directing mechanism for directing said pair of beams in opposite directions along said sensing axis so that each beam impinges upon opposite sides of said proof mass along said sensing axis.

3. An optical accelerometer according to claim 2, wherein said light-directing mechanism comprises one or more optical fibers.

4. An optical accelerometer according to claim 1, wherein said source of optical radiation is a laser source.

5. An optical accelerometer according to claim 1, wherein said intensity adjustor comprises one or more modulators.

6. An optical accelerometer according to claim 2, wherein said intensity adjustor and said splitter are included within an integrated optical chip.

7. An optical accelerometer according to claim 2 further comprising a coupling mechanism for coupling each beam in said pair of beams to an optical fiber.

8. An optical accelerometer according to claim 7 wherein said coupling mechanism comprises one or more fusion splices.

9. An optical accelerometer according to claim 2, further including light focusing means for aligning each beam in said pair of beams along said sensing axis.

10. An optical accelerometer according to claim 9, wherein said light focusing means comprises an output lens.

11. An optical accelerometer according to claim 1, wherein said position detecting system comprises:
   a) an LED (light emitting diode) source; and
   b) a photodetector having a plurality of quadrants;
   wherein upon displacement of said proof mass away from said equilibrium position, an increase in the amount of optical radiation detected in one of said quadrants substantially matches a decrease in the amount of optical radiation detected in another of said quadrants.

12. A three-axis optical accelerometer for detecting an acceleration of a proof mass, the accelerometer comprising:
   a) first, second, and third sources of optical radiation for generating first, second, and third pairs of beams of output radiation, wherein said first, second, and third pairs of beams of output radiation are adapted to exert radiation pressure on said proof mass so as to maintain said proof mass in an equilibrium position along first, second, and third mutually orthogonal sensing axes, respectively, and further wherein combined radiation pressure from said first, second, and third pairs of beams levitates said proof mass in three-dimensional space;
   b) first, second, and third position detecting systems for sensing a displacement from said equilibrium position of said proof mass along said first, second, and third sensing axes, respectively, in response to an acceleration force acting on the proof mass;
   c) first, second, and third intensity adjustors for adjusting an intensity of each beam in said first, second, and third pairs of beams, so as to restore said proof mass to said equilibrium position along said first, second, and third axes;
   wherein a difference in the adjusted intensities of each beam in said first, second, and third pairs of beams is representative of the acceleration of said proof mass along said first, second, and third sensing axes, respectively.

13. An optical accelerometer for detecting an acceleration along a sensing axis, comprising:
   (a) a proof mass positioned along the sensing axis;
   (b) a source of optical radiation for generating a pair of beams of optical radiation, each beam in said pair of beams being adapted to exert radiation pressure on said proof mass upon impact so as to maintain said proof mass in an equilibrium position along said sensing axis;
   (c) means for detecting a displacement of the proof mass along said sensing axis from said equilibrium position in response to an acceleration force acting on the proof mass;
   (d) means for adjusting the intensity of each beam in said pair of beams so as to restore the proof mass to said equilibrium position; and
   (e) means for measuring a difference in the adjusted intensities of each optical beam;
   wherein a difference in the adjusted intensities of each beam in said pair of beams is representative of the acceleration of said proof mass along said sensing axis in response to the acceleration force.

14. A three-channel optical accelerometer for detecting an acceleration of a proof mass, said accelerometer comprising a first, second and third channel having a first, second, and third mutually orthogonal sensing axes associated therewith, each channel comprising:
   (a) a source of optical radiation, wherein a pair of beams of output radiation from said source is adapted to exert radiation pressure on said proof mass so as to maintain said proof mass in an equilibrium position along a sensing axis associated with said channel;
   (c) a position detecting system for sensing a displacement of the proof mass along said sensing axis from said equilibrium position in response to an acceleration force acting on the proof mass; and
   (d) an intensity adjustor for adjusting an intensity of each beam in said pair of beams so as to restore the proof mass to said equilibrium position;
   wherein a difference in the adjusted intensities of each beam in said pair of beams is representative of the acceleration of said proof mass along said sensing axis; and further wherein the combined radiation pressure from each pair of beams in each of said first, second, and third channels levitates said proof mass in three-dimensional space.

15. A method for determining an acceleration, the method comprising:
   positioning a proof mass along a sensing axis;
   generating a pair of beams of optical radiation that exerts radiation pressure on said proof mass so as to maintain said proof mass in an equilibrium position along said sensing axis;
   detecting a displacement of said proof mass along said sensing axis in response to an acceleration force;
   adjusting an intensity of each beam in said pair of beams so as to restore said proof mass to said equilibrium position;
   measuring a difference in the adjusted intensities of each beam so as to determine the acceleration of the proof mass in response to the accelerating force.

* * * * *

UNITED STATES PATENT AND TRADEMARK OFFICE
CERTIFICATE OF CORRECTION

PATENT NO. : 6,867,411 B2
DATED : March 15, 2005
INVENTOR(S) : Kelleher et al.

It is certified that error appears in the above-identified patent and that said Letters Patent is hereby corrected as shown below:

<u>Column 10,</u>
Line 17, from the beginning, delete "(c)", and insert thereof -- (b) --;
Line 21, from the beginning, delete "(d)", and insert thereof -- (c) --.

Signed and Sealed this

Seventh Day of June, 2005

JON W. DUDAS
*Director of the United States Patent and Trademark Office*